May 9, 1961 R. NITSCH 2,983,792

COORDINATE SWITCHING DEVICES

Filed May 17, 1956 3 Sheets-Sheet 1

Inventor:
Rudolf Nitsch
By. [signature] Atty.

May 9, 1961 R. NITSCH 2,983,792

COORDINATE SWITCHING DEVICES

Filed May 17, 1956 3 Sheets-Sheet 2

Inventor:
Rudolf Nitsch
By. [signature] Att'y.

Inventor:
Rudolf Nitsch.
By [signature] Atty

United States Patent Office 2,983,792
Patented May 9, 1961

2,983,792

COORDINATE SWITCHING DEVICES

Rudolf Nitsch, Munich-Solln, Germany, assignor to Siemens & Halske Aktiengesellschaft Berlin and Munich, a corporation of Germany Filed May 17, 1956, Ser. No. 585,557

Claims priority, application Germany June 13, 1955

9 Claims. (Cl. 179—27.54)

This invention is concerned with improvements relating to coordinate switching devices of the type disclosed in copending application Serial No. 573,039, filed March 21, 1956 and also comprising features as disclosed and claimed in co-pending application Serial No. 585,558.

The various objects and features of the invention will be brought out in the course of the description which is rendered below with reference to the accompanying schematic drawings. In these drawings—

Figure 1:
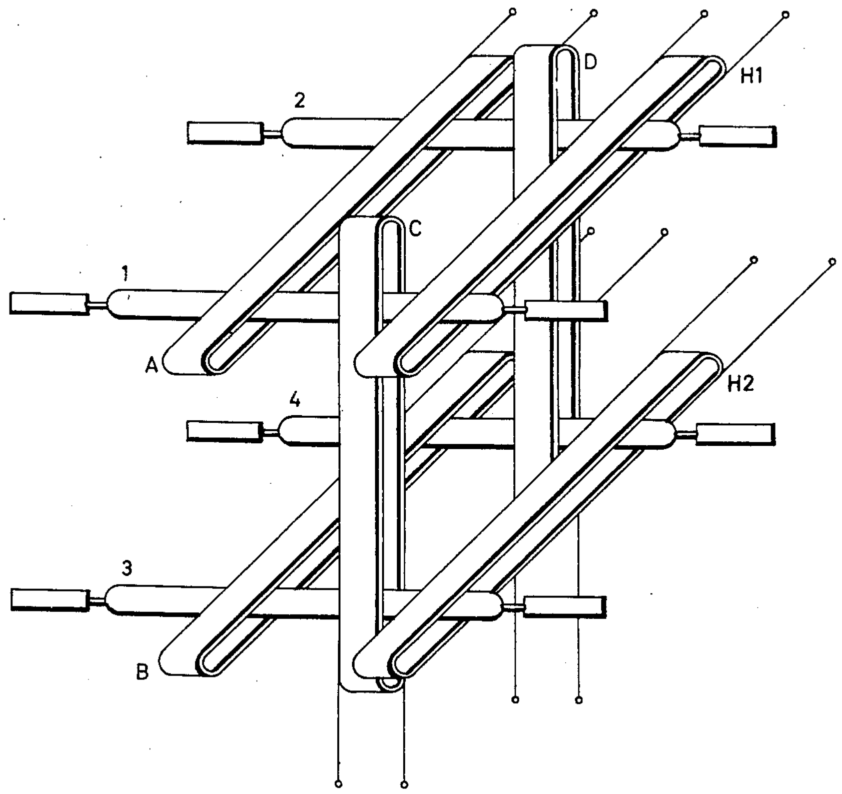
Figure 2B:
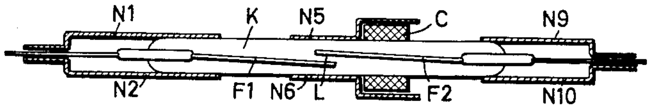
Figure 2A:
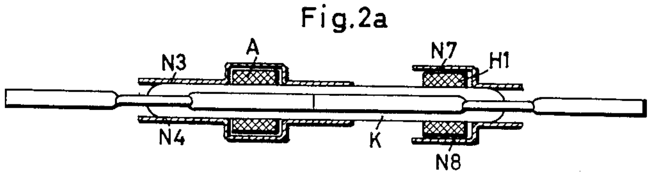
Figure 3A:
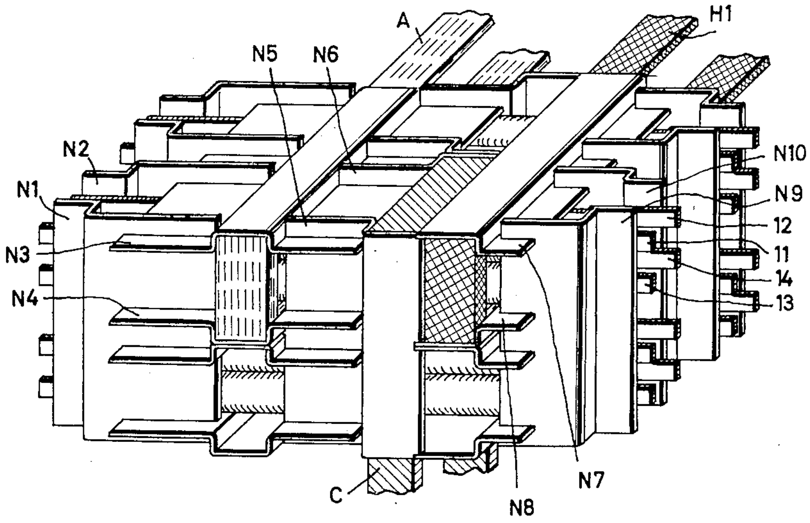
Figure 3B:
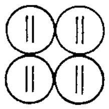
Figure 4:
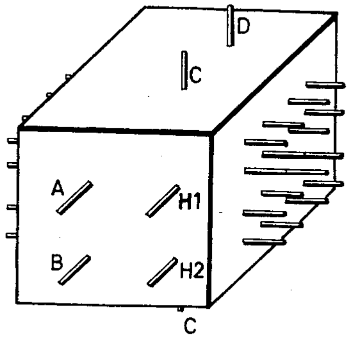
Figure 5:
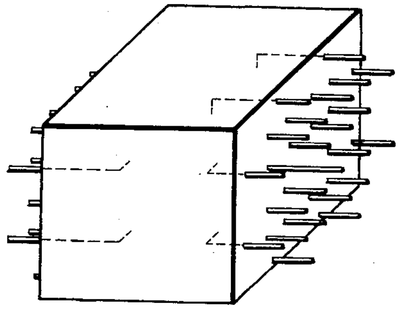
Figure 6:
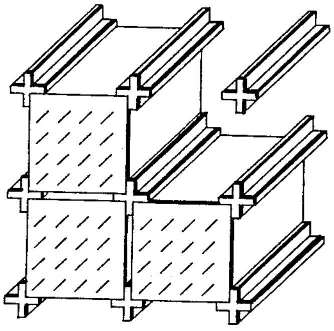
Figure 7:
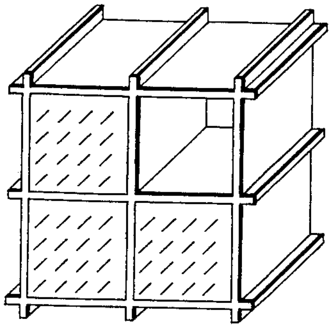
Figure 8:
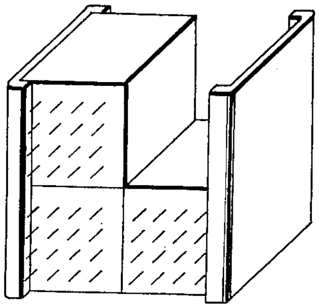

Fig. 1 shows elements of a coordinate switch disclosed in the above-mentioned copending application;

Figs. 2*a* and 2*b* are part sectional views of a contact set for the coordinate switch, embodying shunt means according to the invention;

Figs. 3*a* and 3*b* illustrate an assembly of several contact sets forming a coordinate switch having four crossing points;

Figs. 4 and 5 show in diagrammatic manner coordinate switches encased in molded material; and Figs. 6 to 8 indicate examples of arranging several coordinate switches such as shown in Figs. 4 and 5 respectively alongside one another or in superposed relationship.

The coordinate switch according to the previously mentioned copending application Ser. No. 573,039 comprises, as shown in Fig. 1, a plurality of line and row coils and cooperating holding coils arranged in crossing relationship, each coil embracing the corresponding line or row of the switch. As defined in the claims, the coordinate switch comprises energizing line and row coils disposed in crossing relationship, such coils constituting energizing coils, and auxiliary coils constituting holding coils. At each crossing point of the coils, there is provided a dry reed contact set, as disclosed and claimed in application Serial No. 585,558, disposed in a protective tubing. The expression "dry reed contacts" appears in American literature concerning glass tube enclosed contacts. The term "dry reed" means that these contacts are protected by a tube. In some instances, it may be preferable to use the term "tube protected contact." The illustrated switch has four crossing points and is accordingly provided with four contact sets 1, 2, 3, 4 each comprising dry reed contact means. The contact sets are embraced by the line coils A and B and by the row coils C and D. References H1 and H2 indicate holding coils for maintaining upon energization a closed dry reed contact in actuated position. A greater number of crossing points may of course be provided as desired.

The operation of such a coordinate switch provides for energization of a line and a row coil to produce at the crossing point thereof a magnetic field which is impressed upon the associated contact set and of sufficient magnitude to cause closure of the corresponding dry reed contacts. The associated holding coil is energized if it is desired to maintain the contacts in operated condition after disconnecting the corresponding line and row coils, the holding coil producing a magnetic field sufficient for maintaining the contacts operated. In order to prevent with certainty operative actuation of a further contact set, responsive to energization of other line and row coils disposed in crossing relationship with the energized holding coil, which would result in cross talk, the arrangement according to the copending application provides magnetic shunts for the contact sets, such shunts containing an iron path for generating upon energization of a line and row coil a stray field which weakens the primary field. The stray field impresses at the same time an energy upon the contacts which operates opposite to the energy required for the operative actuation thereof. The undesired contact actuation is thus inhibited by the action of the stray field.

The present invention is particularly concerned with an advantageous structure of the iron path provided in the shunt. In accordance with the invention, the iron path comprises sheet strips extending in parallel about the contact set and disposed therealong so as to result in rectangularly abutting pairs of strips embracing the coils, the pairs of strips thereby entering one into the other in corresponding slots at abutting points adjacent the coils.

Figs. 2*a* and 2*b* show a contact set containing a single contact provided with a shunt according to the invention. This contact set may be assumed to be the one designated in Fig. 1 by numeral 1. The coils in Figs. 2*a* and 2*b* are accordingly designated by references corresponding to Fig. 1. Fig. 2*a* illustrates a part sectional view of the contact as it would appear in Fig. 1; and Fig. 2*b* shows a similar view taken 90° apart, that is, as the contact would appear in Fig. 1 when looking from the top downward. The parts of the iron path lying in the direction of viewing Figs. 2*a* and 2*b* respectively in front and in back of the sectional plane have been omitted for the sake of clarity; accordingly, Figs. 2*a* and 2*b* show in sectional view only the iron parts disposed laterally of the contact.

The dry reed contact as such is designated by K. It is enclosed at its ends by metallic strips N1/N2 and N9/N10. These pairs of strips extend in parallel to the plane of the flat ends of the contact springs F1 and F2 which project from the corresponding protective tubing. The individual metallic strips are electrically insulated from the corresponding ends of the contact springs. The pair of strips N3/N4 is contiguous to the pair of strips N1/N2 and displaced relative thereto by 90°. This displacement is required because, as shown in Fig. 1, the line coil A of the switch extends at right angle to the plane of the ends of the contact springs. The continuation of the iron path from the strips N1/N2 must accordingly be effected by the pair of strips N3/N4 extending perpendicular thereto. This pair of strips can thus extend in parallel to the plane of the line coil A. The strips N3/N4 are suitably bent to embrace the line coil A.

Next in line to the line coil A is the row C which is displaced by 90° relative thereto. Accordingly, the continuation of the iron path must again be displaced correspondingly. The pair of strips N5/N6 are perpendicularly displaced relative to and connect with the pair of strips N3/N4. The pair of strips N5/N6 are bent in similar manner as the strips N3/N4 and embrace the row coil C. Closely adjacent the row coil C and extending perpendicular thereto is disposed the holding coil H1 which is embraced by the pair of strips N7/N8 which, of course, must be angularly displaced by 90° relative to the pair of strips N5/N6. Next in line to the pair of strips N7/N8 is the previously mentioned pair of strips N9/N10 which extends in parallel with the plane of the contact spring and, accordingly, angularly displaced by 90° relative to the pair of strips N7/N8.

In order to provide for an effective magnetic connection between the individual metallic strip pairs, there are slots formed therein into which the individual strips project in interlaced or nestling relationship. The strips extend well beyond a median line intersecting the gap between the contact spring F1 and F2. The width by which the strips extend beyond such line determines the magnitude of the magnetic resistance between the working gap L and the iron path. This magnetic resistance may be adjusted to the necessary value by the length of overlap of the metallic strips relative to the working gap. The further determination of the magnetic resistance depends substantially upon the construction of the dry reed contact.

Fig. 3*a* illustrates an assembly of a plurality of contact sets with their associated metallic strips, forming a coordinate switch with four crossing points, the principle of which is illustrated in Fig. 1. Four dry reed contacts are provided at each crossing point. The contact set corresponding to the contact set 1 in Fig. 1 contains individual dry reed contacts 11, 12, 13, 14. The four protective tubings are disposed symmetric to each other; a simplified sectional view appears in Fig. 3*b*. The switch contains two line coils and two row coils and two holding coils, only the line coil A and the row coil C and the holding coil H1 being shown in Fig. 3*a* so as to keep the drawing simple. The protective tubings for the contacts is visible at places where the coils have been omitted. In order to distinguish the individual coils, the line coil appears hatched longitudinally; the row coil appears hatched obliquely; and the holding coil appears crosshatched. The pairs of metallic strips forming the iron path correspond to those also shown in Figs. 2*a* and 2*b* and are for the contact set containing contacts 11 to 14 analogously marked. As compared with Figs. 2*a* and 2*b*, the pairs of metallic strips extend respectively over the entire line and row, thus forming as assembled a cage containing the coils and the bent portions embracing the coils as well as the contact sets.

The pairs of metallic strips N1/N2 and N9/N10 are disposed at the opposite ends of the contact set being considered. Next in line to the strip pair N1/N2 is the strip pair N3/N4 having the bent portion which embraces the line coil A. The internestling of the metallic strips N1/N2 and N3/N4 is clearly apparent from the drawing and the same is true with respect to the remaining pairs of metallic strips. The pair of strips N3/N4 is followed by the pair of strips N5/N6 which embraces the row coil C along its bent-over portion. Next in line is the pair of metallic strips N7/N8 containing the holding coil H1 and following this is the pair of strips N9/N10.

It will be apparent from Fig. 3*a* that the switch constitutes a closed structural unit which is held together by the internestling metallic strips and carries the contact sets. In order to unite the individual structural parts of the switch firmly so as to form an entity, it is suitable to mold the whole in the form of a block, thus making fasting means for the parts superfluous. The resulting structural element is then in the form of a block from which only the coil and contact terminals project. The molding in block form offers additional advantages, namely, protection against corrosion and mechanical damage as well as damping of switching noises, as small as they may be, incident to the operation of the switch.

Fig. 4 shows an example of the molded switch. The terminals projecting from the right and left of the molded block belong to the switch contacts; the terminals projecting from the top and bottom belong to the row coils C and D; and those projecting from the front and rear belong to the line coils A and B and also to the holding coils H1 and H2.

In accordance with Fig. 5, the terminals connecting with the coils are bent within the molded block so that they project therefrom at the same ends as the contact terminals.

The latter embodiment offers the advantage of placing several such switches alongside one another or stacked upon one another, thus making it possible to dispose a plurality of switches in a manner that saves considerable space.

Corresponding assemblies of a plurality of switches are indicated in Figs. 6 to 8. In Figs. 6 and 7, there are provided special frame parts forming openings into which the switches may be individually slipped. The arrangement according to Fig. 8 permits stacking the individual switches vertically, requiring holding or frame means only on the sides.

Changes may be made within the scope and spirit of the appended claims.

I claim:

1. In a coordinate switch having a plurality of contact sets, each positioned at a crossing point of such switch, each contact set comprising a pair of magnetizable contact springs disposed within a sealed protective tube with the inner ends in overlapping movable relationship inside of said tube forming in normal position thereof a working gap therebetween and the outer ends extending from said tube and being fixedly sealed thereto, line and row control coils embracing at said crossing points the protective tubes of a plurality of said contact sets respectively along each side of the working gap of the contact springs disposed therein, and a magnetic shunt between the movable inner end of each spring and the outer fixedly disposed end thereof which extends from said protective tube, each shunt extending along an iron path over a shunt gap which spaces such iron path from the movable inner end of the corresponding spring, the combination of a plurality of metallic strips cooperable to form the shunts of the respective contact sets, said strips being arranged in cooperable pairs disposed at opposite sides of respective contacts sets and defining an individual shunt path for each of said contact sets, certain pairs of strips extending transverse to other pairs of strips and arranged to form intersecting surfaces, portions of intersecting strips having slots formed therein adapted to receive a portion of the associated intersecting strip, said intersecting strips being arranged to form such an iron path between the movable inner end of each spring and the other fixedly disposed end thereof.

2. A coordinate switch as defined in claim 1, wherein certain of said strips are shaped to form recesses for holding the coils.

3. A coordinate switch as defined in claim 1, wherein cooperable pairs of said strips are arranged in parallel series, the pairs of certain series being disposed at opposite sides of the respective coils, with the strips of adjacent series being disposed at right angles to one another.

4. A coordinate switch as defined in claim 1, wherein said line and row coils are disposed in respective planes extending parallel to one another, a plurality of holding coils disposed in a common plane extending parallel to the planes of said line and row coils, the corresponding coils in said outer planes extending parallel to one another and disposed transverse to the coils in the intermediate plane, the coils in one of the outer planes comprising said holding coils, each coil having portions of a pair of strips extending parallel thereto, and a pair of strips adjacent opposite ends of said tubes extending parallel to the intermediate coils and disposed at opposite sides of a series of aligned tubes, whereby said shunts are each formed by a plurality of pairs of strips, alternate pairs of strips extending transversely to the intermediate pairs of strips and connected thereto.

5. A coordinate switch as defined in claim 4, wherein said pairs of strips disposed adjacent said coils are provided with outwardly disposed longitudinally extending offsets between which the associated coil is disposed, the remaining opposite disposed portions embracing the contact sets disposed therebetween.

6. A coordinate switch according to claim 1, wherein said assembled metallic strips form a cage containing the coils and the corresponding contact sets in engagement therewith.

7. A coordinate switch according to claim 6, comprising material molded thereabout forming a solid block.

8. A coordinate switch according to claim 7, comprising terminal contact means projecting from two opposite sides of said block.

9. A plurality of coordinate switches according to claim 8, disposed in a frame.

References Cited in the file of this patent

UNITED STATES PATENTS 2,187,115 Ellwood ---------------- Jan. 16, 1940

OTHER REFERENCES

"Potted Circuits," Wireless World, December 1951, p. 493.

"Potting Gives Maximum Reliability," Electronic Equipment, January 1956, p. 48.